No. 708,345. Patented Sept. 2, 1902.
N. W. GRISWOLD.
WATERING TROUGH, BOWL, OR BASIN.
(Application filed Nov. 11, 1901.)
(No Model.) 2 Sheets—Sheet 1.

WITNESSES: INVENTOR:
Norman W. Griswold
By Jno. L. Boone
Att'y.

No. 708,345. Patented Sept. 2, 1902.
N. W. GRISWOLD.
WATERING TROUGH, BOWL, OR BASIN.
(Application filed Nov. 11, 1901.)
(No Model.) 2 Sheets—Sheet 2.
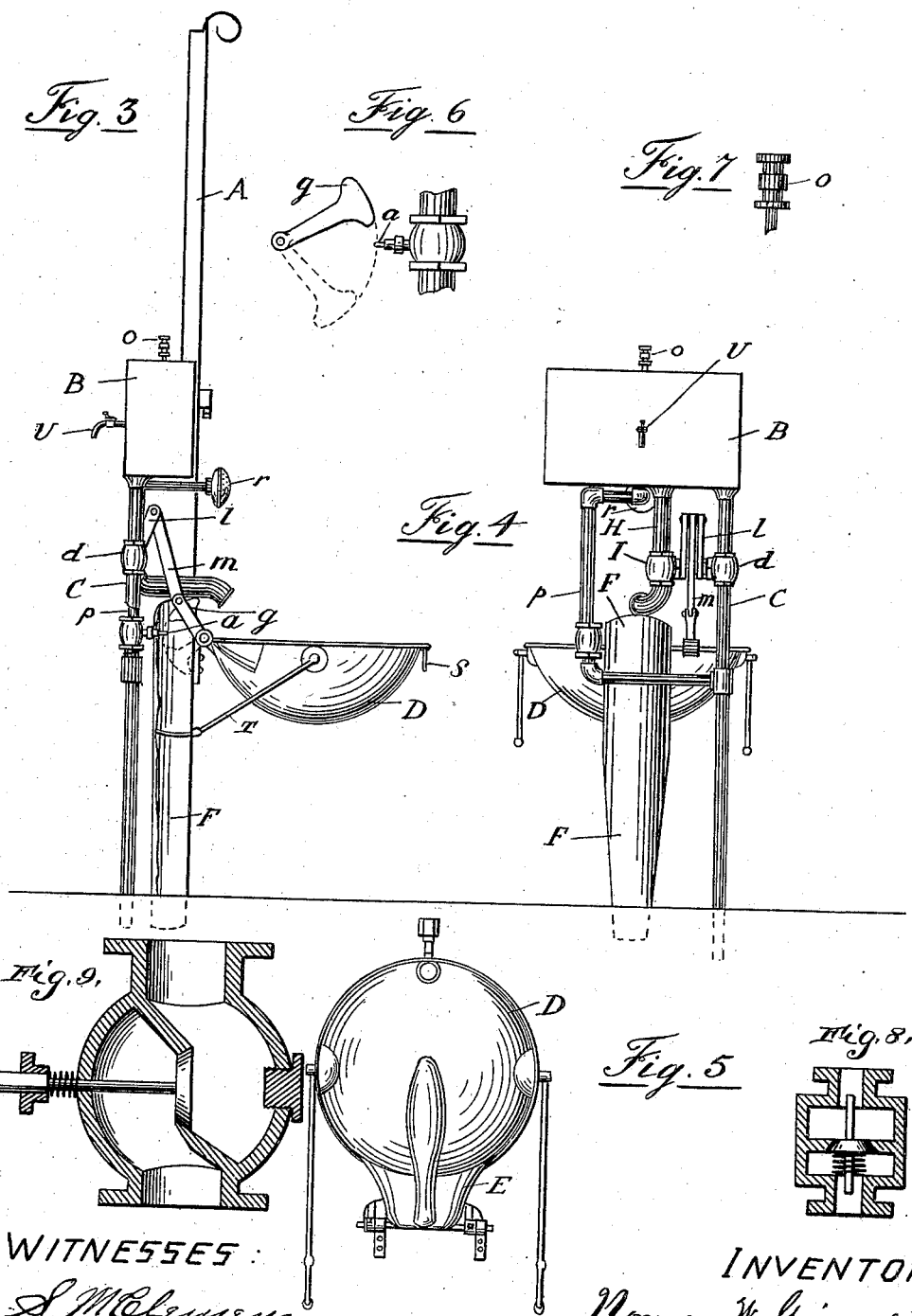
WITNESSES:
A. M. Clemens
William Muir
INVENTOR:
Norman W. Griswold
By Jno. L. Boone
Att'y.

UNITED STATES PATENT OFFICE.

NORMAN W. GRISWOLD, OF HONOLULU, TERRITORY OF HAWAII.

WATERING TROUGH, BOWL, OR BASIN.

SPECIFICATION forming part of Letters Patent No. 708,345, dated September 2, 1902.

Application filed November 11, 1901. Serial No. 81,929. (No model.)

*To all whom it may concern:*

Be it known that I, NORMAN W. GRISWOLD, a citizen of the United States, and a resident of Honolulu, in the Hawaiian Islands, have invented certain new and useful Improvements in Watering Troughs, Bowls, or Basins; and I do hereby declare the following to be a full, clear, and exact description of said invention, such as will enable others skilled in the art to which it most nearly appertains to make, use, and practice the same.

My invention relates to an improved watering-trough which is especially adapted for use on the streets of a city or town instead of the long open water-trough now in use; and it consists of a bowl or basin of peculiar construction hinged to an upright framework, so that it can be turned up and emptied and after it is emptied fastened with its open side against the framework, and a system of water-supply pipes and automatically-operated cocks and faucets by which the movement of the hinged bowl or basin in opening and closing will not only cause a spray or jet of water to be ejected against the interior of the bowl or basin for the purpose of cleaning it, but will operate a cock when the bowl is being opened or dropped to a horizontal position that will open communications with a supply-tank, which contains a sufficient quantity of water to fill the bowl, all as hereinafter more fully described.

Figure 1:
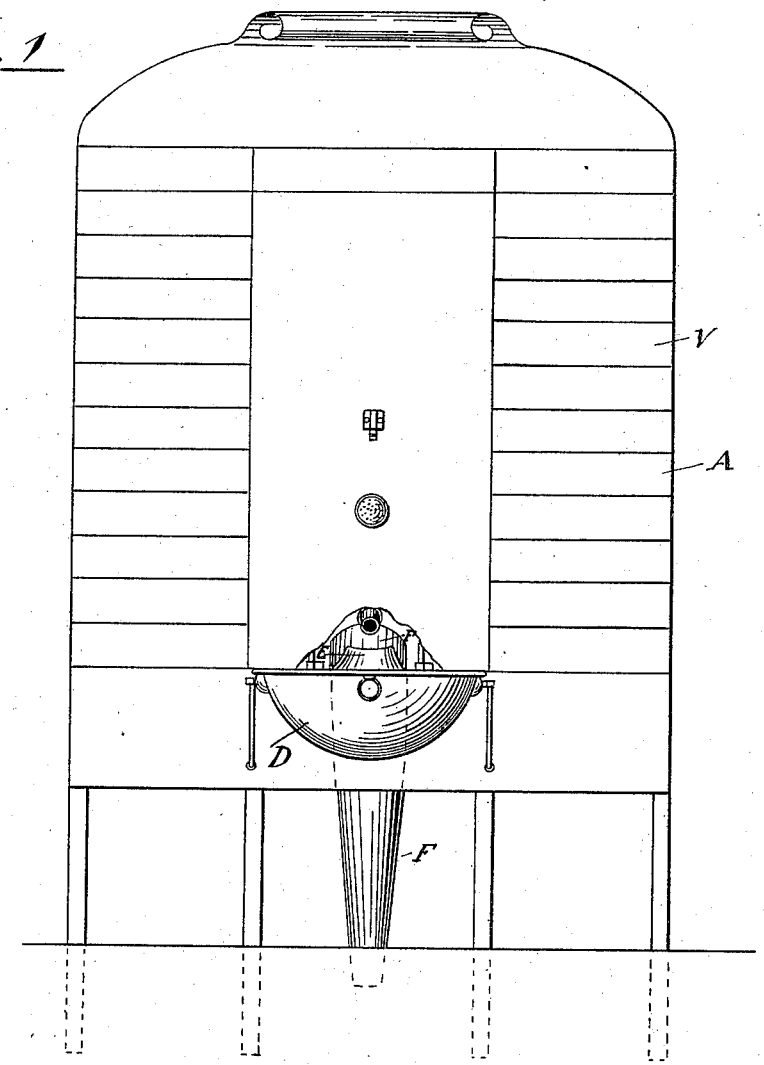
Figure 2:
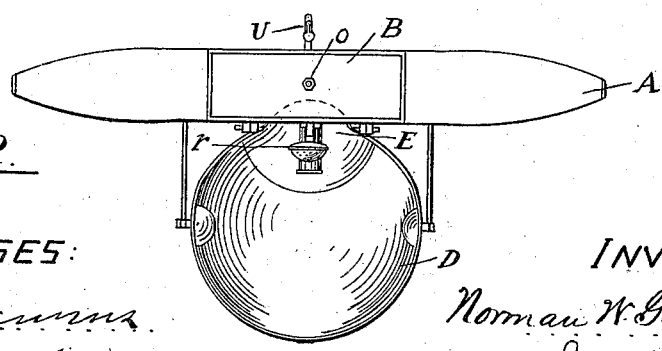

Referring to the accompanying drawings, Figure 1 is a front view showing a section of the front of the casing broken away directly above the basin-spout to show the outline of the upper end of the waste-spout. Fig. 2 is a top view of the casing, showing the bowl in its horizontal position. Fig. 3 is a side elevation of the water-pipes and mechanism with casing removed. Fig. 4 is a rear view with casing removed. Fig. 5 is a view of the bowl in its closed position. Fig. 6 shows the cam of the bowl and the spring-valve which it operates, and Fig. 7 is an enlarged view of the air-valve on top of tank.

Let A represent a framework of wood or metal. This framework is only thick enough to inclose and contain the system of pipes, tank, &c., hereinafter described. I shall usually make it of metal, and preferably it will be a metallic box from two to three inches thick, about four or five feet high, and from two to three feet wide, although its dimensions may vary. This framework I erect at the outer edge of a sidewalk so as to extend parallel with the street. The side of the framework that faces the street I will call the "front" and the side which faces the sidewalk I will call the "back." Inside of this box at or near the top of the framework A, I secure a strong tank, (marked B,) which is connected by a pipe C with the water-main or other source of water-supply, and in the length of this pipe I provide a cock $d$, which is operated by the opening and closing basin hereinafter described, so as to fill the tank in the manner hereinafter set forth.

Hinged to the front of the framework at the proper height to permit animals to drink from it is a bowl or basin D, which has a spout or discharge-opening E at its rear edge between its hinged bearings, and directly below this spout or discharge-opening is a waste-spout F, into which the spout of the bowl will empty any contents of the basin or bowl when the basin or bowl is turned upward on its hinges against the front of the framework. This waste-spout may connect with the street-sewer or it may empty into the gutter of the street.

A separate pipe H leads downward from the bottom of the tank B to a short distance and is then bent outward, so as to pass through the front of the box or framework, and terminates in a position to empty the contents of the tank into the bowl when the bowl has been lowered, and a valve I in the length of this pipe is opened by the lowering of the bowl through the medium of a valve mechanism described below. The valve $d$, which admits water through the main feed-pipe to the tank B, is located opposite the valve I in the pipe H, which conducts the water from the tank into the bowl or basin D, and these two valves are opened and closed alternately and simultaneously by the movement of a forked lever $l$ and a jointed lever $m$, (shown at Fig. 4,) which latter is connected with the basin, so that when the bowl or basin is closed, or, rather, raised into its closed position, the jointed lever $m$ is carried up with it and moves the forked lever $l$ so as to open the valve $d$ of the feed-pipe and at the same time close the valve I of the pipe H. This allows the water to flow through the feed-pipe into and fill the tank B; but when the bowl or basin is lowered to its horizontal position the reverse movement of the aforesaid levers closes the valve $d$ of the feed-pipe and opens the valve I of the discharge-pipe H and allows the water in the tank to flow down through pipe H into the bowl or basin. An automatic air-valve $o$ in the top of the tank permits the tank to empty itself freely when the valve I of pipe H is open.

A branch pipe $p$ is connected by a T-coupling with the main feed-pipe C and leads upward to a point opposite the upper edge of the bowl or basin when it is closed. At this point it projects out through the front of the box and has a sprinkler or rose $r$ secured to its extremity. In the length of this branch pipe opposite the lower edge of the bowl or basin is a spring-valve, which is opened by pressure on a push-pin $a$. The bowl or basin has a lever-arm $g$ projecting rearward from it in such position that its rear end will press upon the pin $a$ when the bowl is being opened or closed, thus opening the valve and allowing a spray of fresh water to be ejected from the rose into and against the bottom of the bowl both when it is being opened and when it is being closed. This spray washes and cleans the bowl twice each time it is used, thus preventing infection and insuring cleanliness. When the bowl is closed, it is fastened in its closed position by a hook $s$ or other fastening device, so that the projecting pipes are hidden and nothing but the bottom of the bowl is seen from the front, and when it is desired to water a horse or other animal the bowl is lowered to a horizontal position, where it can be held by hinged supporting-rods T or other device. As it starts to fall to its horizontal position the lever-arm $g$ opens the spring-valve and allows a spray of water to be ejected against the bottom of the bowl, which cleanses the bowl and immediately passes into the waste-spout before the bowl is fully lowered. As the bowl reaches its horizontal position the jointed lever $m$ operates the valves $d$ I so as to close the valve $d$ and open the valve I. This allows the water in tank B to be discharged into and fill the bowl. After the animal has been watered the bowl is closed again. This empties the remaining contents into the waste-pipe, and in closing the bowl the spray-pipe is again operated to spray the bottom of the bowl. I also connect a faucet U with the tank B or with the main pipe C at the back of the framework and hang a drinking-cup in a convenient position, so that passers-by on the sidewalk can secure a drink of water whenever desired.

Surrounding the box or casing which contains the water-tank and system of pipes I construct a thin wall or screen V, which extends laterally on each side of the bowl and casing and also to a distance above it, so as to shut off the view of passers on the sidewalk and permit the animals to drink from the bowl or basin without becoming frightened. This screen or border can form a bulletin-board or a space for placing advertisements.

Having thus described my invention, what I claim, and desire to secure by Letters Patent, is—

1. In a watering-trough for animals a hinged bowl or basin adapted to be moved on its hinged bearings to a vertical position so as to empty its contents: a closed tank supported at an elevation higher than the bowl or basin and connected by a pipe with a source of water-supply, an air-valve in the top of the tank: a pipe leading downward from the bottom of the tank so as to discharge into the bowl or basin: a valve in the feed-pipe and a valve in the discharge-pipe and means operated by the raising and lowering of the bowl or basin whereby said valves are opened and closed alternately so as to successively admit water into the tank and then discharge it into the bowl substantially as described.

2. In a watering-trough for animals a bowl or basin provided with a discharge-spout on one side and supported on hinged bearings on each side of said spout, a latch adapted to engage with the opposite rim of said bowl or basin when it is elevated and closed: a waste-spout adapted to receive the contents of the bowl when it is tipped to a vertical position and a rigid arm attached to said bowl and adapted to operate a spray within the bowl or basin as it is opened and closed, substantially as described.

3. In a watering-trough for animals a bowl or basin supported on hinged bearings and adapted to be raised to a vertical position: means for alternately filling and emptying said bowl or basin: and a spray-pipe connected with the water-supply and operated by the movements of the bowl or basin in opening or closing whereby a spray of fresh water is ejected into and against the bottom of the bowl each time it is raised and lowered substantially as described.

4. In a watering-trough for animals, a bowl or basin adapted to be raised to a vertical position on hinged bearings; means for filling the bowl or basin when it is lowered to a horizontal position, and for emptying its contents when it is raised to a vertical position, and a thin wall or screen extending on each side and above the trough or basin, substantially as described.

In witness whereof I have hereunto signed my name this 4th day of September, 1901.

NORMAN W. GRISWOLD.

Witnesses:
E. R. HANDY,
F. C. HANDY.